(12) United States Patent
Schaefer et al.

(10) Patent No.: US 8,373,004 B2
(45) Date of Patent: *Feb. 12, 2013

(54) METHOD FOR PRODUCING COLORLESS ISOCYANURATES OF DIISOCYANATES

(75) Inventors: Harald Schaefer, Mannheim (DE); Carl Jokisch, Mannheim (DE); Horst Binder, Lampertheim (DE); Matthias Kroner, Eisenberg (DE); Alexander Bayer, Limburgerhof (DE)

(73) Assignee: BASF SE, Ludwigshafen (DE)

(*) Notice: Subject to any disclaimer, the term of this patent is extended or adjusted under 35 U.S.C. 154(b) by 348 days.

This patent is subject to a terminal disclaimer.

(21) Appl. No.: 12/530,469

(22) PCT Filed: Mar. 27, 2008

(86) PCT No.: PCT/EP2008/053619
§ 371 (c)(1),
(2), (4) Date: Sep. 9, 2009

(87) PCT Pub. No.: WO2008/116897
PCT Pub. Date: Oct. 2, 2008

(65) Prior Publication Data
US 2010/0022707 A1  Jan. 28, 2010

(30) Foreign Application Priority Data

Mar. 27, 2007  (EP) .................. 07104962
Mar. 27, 2007  (EP) .................. 07104971
Mar. 27, 2007  (EP) .................. 07104982

(51) Int. Cl.
C07C 249/00 (2006.01)
C07C 251/00 (2006.01)
C07C 257/00 (2006.01)
C07C 265/00 (2006.01)
C07C 267/00 (2006.01)
C07C 291/00 (2006.01)
C07C 261/00 (2006.01)
C07C 269/00 (2006.01)
C07C 271/00 (2006.01)
C07D 251/00 (2006.01)
C07D 251/32 (2006.01)
C09K 3/00 (2006.01)

(52) U.S. Cl. .......... 560/351; 544/193; 544/222; 560/25; 560/26; 560/116; 560/158; 502/200; 252/182.2; 252/182.21; 252/182.22

(58) Field of Classification Search .......... 544/193; 544/222; 560/26, 25, 116, 158, 351; 502/200; 252/182.2, 182.21, 182.22
See application file for complete search history.

(56) References Cited

U.S. PATENT DOCUMENTS

| 3,817,939 | A | | 6/1974 | Allen et al. |
| 3,919,218 | A | | 11/1975 | Schmitt et al. |
| 3,995,997 | A | | 12/1976 | Boehmke et al. |
| 4,040,992 | A | * | 8/1977 | Bechara et al. .............. 521/117 |
| 4,075,163 | A | | 2/1978 | Hofer et al. |
| 4,324,879 | A | | 4/1982 | Bock et al. |
| 4,335,219 | A | | 6/1982 | Clarke et al. |
| 4,379,905 | A | | 4/1983 | Stemmler et al. |
| 4,454,317 | A | | 6/1984 | Disteldorf et al. |
| 4,487,928 | A | | 12/1984 | Richter et al. |
| 4,499,253 | A | | 2/1985 | Kerimis et al. |
| 4,537,961 | A | * | 8/1985 | Robin ........................ 544/193 |
| 4,582,888 | A | * | 4/1986 | Kase et al. ..................... 528/49 |
| 4,596,678 | A | | 6/1986 | Merger et al. |
| 4,596,679 | A | | 6/1986 | Hellbach et al. |
| 4,801,663 | A | | 1/1989 | Ueyanagi et al. |
| 4,820,830 | A | | 4/1989 | Blank |
| 5,087,739 | A | | 2/1992 | Bohmholdt et al. |
| 5,502,150 | A | * | 3/1996 | Steppan et al. ................. 528/60 |
| 6,552,154 | B1 | * | 4/2003 | Kohlstruk et al. .............. 528/52 |
| 2004/0087715 | A1 | * | 5/2004 | Ohrbom et al. ................ 524/606 |
| 2010/0292396 | A1 | * | 11/2010 | Binder et al. .................. 524/590 |

FOREIGN PATENT DOCUMENTS

| DE | 26 31 733 | | 2/1977 |
| DE | 28 06 731 | | 8/1979 |
| DE | 29 01 479 | | 7/1980 |
| DE | 202 015 | | 8/1983 |
| DE | 32 19 608 | | 9/1983 |
| DE | 38 10908 | | 10/1988 |
| DE | 38 06 276 | | 9/1989 |
| DE | 10 2004 012 571 | | 9/2005 |
| EP | 0 010 589 | | 5/1980 |
| EP | 0 126 299 | | 11/1984 |
| EP | 0 126 300 | | 11/1984 |
| EP | 0 330 966 | | 9/1989 |
| EP | 0 355 443 | | 2/1990 |
| EP | 0 355 479 | | 2/1990 |
| EP | 0661315 | * | 12/1994 |
| EP | 0 798 299 | | 10/1997 |
| EP | 0 896 009 | | 2/1999 |
| EP | 1 668 271 | | 1/2009 |
| GB | 1 391066 | | 4/1975 |
| WO | 2005 113626 | | 12/2005 |
| WO | 2008 068198 | | 6/2008 |
| WO | WO 2008/068198 | * | 6/2008 |
| WO | 2008 116893 | | 10/2008 |
| WO | 2008 116895 | | 10/2008 |
| JP | 2 110123 | | 4/1990 |
| JP | H02-110123 | * | 4/1990 |
| WO | 2004 076519 | | 9/2004 |
| WO | 2004 076520 | | 9/2004 |

OTHER PUBLICATIONS

U.S. Appl. No. 12/530,807, filed Sep. 11, 2009, Keller, et al. U.S. Appl. No. 12/593,295, filed Sep. 28, 2009, Schaefer, et al.

* cited by examiner

Primary Examiner — Patrick Ryan
Assistant Examiner — Aaron Greso
(74) Attorney, Agent, or Firm — Oblon, Spivak, McClelland, Maier & Neustadt, L.L.P.

(57) ABSTRACT

The present invention relates to a novel process for preparing colorless, isocyanurate group-comprising polyisocyanates of (cyclo)aliphatic diisocyanates.

7 Claims, No Drawings

METHOD FOR PRODUCING COLORLESS ISOCYANURATES OF DIISOCYANATES

The present invention relates to a novel process for preparing colorless, isocyanurate group-comprising polyisocyanates of (cyclo)aliphatic diisocyanates.

EP 330966 A2 describes a process for preparing isocyanurate group-comprising polyisocyanates of hexamethylene 1,6-diisocyanate from monomeric hexamethylene 1,6-diisocyanate in the presence of only small amounts of carbon dioxide ($CO_2$) (less than 20 ppm) in the presence of quaternary ammonium hydroxide catalysts.

The catalysts described there can comprise alcohols as solvents and therefore lead to a certain proportion of urethane groups in the product. According to page 4, line 34 ff, the use of solvents having groups which are reactive toward isocyanate is therefore less preferred.

The removal of $CO_2$ represents a technically complicated step which should be avoided.

DD 202015 describes the trimerization of hexamethylene 1,6-diisocyanate in the presence of catalysts having an aminosilyl group. To deactivate the catalyst, the addition of an acidic compound is recommended.

DD 209466 describes the trimerization of hexamethylene 1,6-diisocyanate in the presence of catalysts having an aminosilyl group. Deactivation of the catalyst is carried out by means of compounds bearing hydroxy groups, for example alcohols, phenols or bisurethanes. Such compounds must therefore not be present in the reaction mixture since they would otherwise stop the reaction prematurely.

However, a disadvantage of such catalysts comprising aminosilyl groups is that the catalysts are relatively inefficient and have to be used in large amounts. After deactivation, the catalyst either remains in the product or has to be removed in a costly fashion.

DE 3810908 C2 describes the trimerization of hexamethylene 1,6-diisocyanate in the presence of ammonium hydroxides or carboxides or metal salts of alkylcarboxylic acids after the hexamethylene 1,6-diisocyanate has, before the cyclotrimerization, optionally been reacted with from 0.5 to 5% by weight of an alcohol for a period of from 10 minutes to 3 hours at a temperature of from 40 to 120° C., with the alcohol also being able to function as cocatalyst. The reaction is stopped by heating or by addition of a catalyst inactivator. For the deactivation by means of a catalyst inactivator, DE 3810908 C2 discloses only phosphoric acid or sulfuric acid, which in the explicitly disclosed examples leads to precipitation of crystals and to yellowish products which no longer meet present-day requirements for surface coating polyisocyanates. JP 2-110123 A discloses the use of compounds having sulfinamide or carboxamide groups as catalyst poison for stopping the cyclotrimerization reaction of aliphatic or alicyclic isocyanates. Examples given for carboxamide groups also include carbamate and urea groups.

Mention is explicitly made of urea and urea derivatives such as methylurea and dimethylurea, thiourea and thiourea derivatives such as methylthiourea and dimethylthiourea and carbamates such as phenyl carbamate, ethyl carbamate and butyl carbamate.

The international application number PCT/EP2007/063069 filed on Nov. 30, 2007, which is not a prior publication, discloses a new way of stopping the trimerization reaction. Example 5 describes preurethanization by means of ethanol and gives a product having a color number of 34 Hz, which is likewise in need of improvement.

It was an object of the present invention to provide a process by means of which isocyanurate group-comprising polyisocyanate mixtures having a lower color number and/or a higher color stability during storage, if appropriate in the presence of curing catalysts, can be prepared.

The object is achieved by a process for preparing isocyanurate group-comprising polyisocyanate mixtures of (cyclo)aliphatic diisocyanates, which comprises the reaction steps a) reaction of monomeric (cyclo)aliphatic diisocyanate (D) with at least one monofunctional or bifunctional alcohol (A) having from 3 to 10 carbon atoms to form urethane groups in the absence of compounds which catalyze this reaction, b) reaction of the reaction mixture obtained from a) in the presence of at least one catalyst (K) which is able to catalyze the reaction of isocyanates to form isocyanurate groups, c) deactivation of the catalyst (K) from step b) by addition of a catalyst poison (S), d) separation of the unreacted (cyclo)aliphatic diisocyanate (D) from the reaction mixture obtained in this way from c) and e) optionally ozonolysis of the distillation bottoms obtained from d), wherein the catalyst poison (S) is a compound of the formula

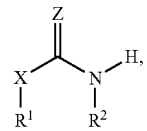

where $R^1$ and $R^2$ are each, independently of one another, hydrogen or $C_1$-$C_{20}$-alkyl, $C_6$-$C_{12}$-aryl or $C_5$-$C_{12}$-cycloalkyl which may each optionally be substituted by aryl, alkyl, aryloxy, alkyloxy, heteroatoms and/or heterocycles, where when X=O or S, $R^1 \neq H$ and $R^1$ and $R^2$ together with the group X—(CO)—NH can also form a 5 to 12-membered ring, with $R^1$ and $R^2$ together forming an optionally substituted divalent $C_2$-$C_9$-alkylene radical which can also be part of an arylene or cycloalkylene radical, Z is oxygen (O) or sulfur (S), preferably oxygen, X is oxygen (O), sulfur (S), imino (NH) or substituted imino ($NR^3$) and $R^3$ is $C_1$-$C_4$-alkyl, where the radical $R^1$ in the case of the compounds (S) has at least one, preferably precisely one, group which is reactive toward isocyanate.

The isocyanurate group-comprising polyisocyanate mixtures obtained by the process of the invention display a lower color number and/or a higher color stability. A further advantage is that the polyisocyanate mixtures obtained display only a relatively small increase in color number on storage in the presence of catalysts for the production of 2-component polyurethane surface coatings, generally Lewis acids and, if appropriate, further surface coating constituents.

The diisocyanate (D) in the process of the invention is a (cyclo)aliphatic diisocyanate, which in the present text is used as an abbreviation for cycloaliphatic or aliphatic diisocyanates.

Cycloaliphatic isocyanates are ones which comprise at least one cycloaliphatic ring system.

Aliphatic isocyanates are ones which comprise exclusively linear or branched chains, i.e. acyclic compounds.

The monomeric isocyanates are preferably diisocyanates which bear precisely two isocyanate groups. However, they would in principle also be monoisocyanates having one isocyanate group, but these are less preferred.

Higher isocyanates having an average of more than 2 isocyanate groups are also possible in principle, but these are less preferred. Suitable isocyanates of this type are, for example, triisocyanates such as triisocyanatononane or 2'-isocyanatoethyl 2,6-diisocyanatohexanoate or mixtures of diisocyanates, triisocyanates and higher polyisocyanates.

The monomeric isocyanates comprise essentially no reaction products of the isocyanate groups with themselves.

The monomeric isocyanates are preferably isocyanates having from 4 to 20 carbon atoms. Examples of customary diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, (e.g. methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane and also 3 (or 4), 8 (or 9)-bis(isocyanatomethyl)tricyclo[5.2.1.0$^{2,6}$]decane isomer mixtures.

Particular preference is given to hexamethylene 1,6-diisocyanate, 1,3-bis(isocyanatomethyl)cyclohexane and isophorone diisocyanate, with very particular preference being given to isophorone diisocyanate and hexamethylene 1,6-diisocyanate, in particular hexamethylene 1,6-diisocyanate.

It is also possible for mixtures of the isocyanates mentioned to be present.

Isophorone diisocyanate is usually present as a mixture of the cis and trans isomers, generally in a ratio of from about 60:40 to 80:20 (w/w), preferably in a ratio of from about 70:30 to 75:25 and particularly preferably in a ratio of about 75:25.

The content of isomeric compounds in the diisocyanate (D) does not play a critical role according to the invention. Thus, hexamethylene 1,6-diisocyanate can comprise, for example, a small proportion of 2- and/or 3-methylpentamethylene 1,5-diisocyanate.

For the purposes of the present invention, it is possible to use either a diisocyanate (D) obtained by phosgenation of the corresponding amines or a diisocyanate prepared without the use of phosgene, i.e. by phosgene-free processes. According to EP-A-0 126 299 (U.S. Pat. No. 4,596,678), EP-A-126 300 (U.S. Pat. No. 4,596,679) and EP-A-355 443 (U.S. Pat. No. 5,087,739), for example, it is possible to prepare (cyclo) aliphatic diisocyanates such as hexamethylene 1,6-diisocyanate (HDI) by reaction of the (cyclo)aliphatic diamines with, for example, urea and alcohols to form (cyclo)aliphatic biscarbamic esters and thermal dissociation of these into the corresponding diisocyanates and alcohols. The synthesis is usually carried out continuously in a circulation process and, if appropriate, in the presence of N-unsubstituted carbaminic esters, dialkyl carbonates and other by-products recirculated from the reaction process. The diisocyanates obtained in this way generally have a very low or even unmeasurable proportion of chlorinated compounds, which can lead to advantageous color numbers of the products.

In one embodiment of the present invention, the diisocyanate (D) has a total content of hydrolyzable chlorine of less than 200 ppm, preferably less than 120 ppm, particularly preferably less than 80 ppm, very particularly preferably less than 50 ppm, in particular less than 15 ppm and especially less than 10 ppm. This can, for example, be measured according to the ASTM method D4663-98. However, it is of course also possible to use diisocyanates (D) having a higher chlorine content, for example up to 500 ppm.

Mixtures of diisocyanate (D) obtained by reaction of the corresponding diamine with, for example, urea and alcohols and dissociation of the resulting biscarbamic esters with diisocyanate obtained by phosgenation of the corresponding amine can of course also be used.

Possible monofunctional or bifunctional alcohols (A) having from 3 to 10 carbon atoms are preferably alkanols and alkanediols, with particular preference being given to alkanols.

The compounds (A) preferably have from 3 to 9 carbon atoms, particularly preferably from 4 to 9 carbon atoms and very particularly preferably from 6 to 8 carbon atoms.

It is an advantage of alcohols having more than 3 carbon atoms that they and the corresponding urethanes with the diisocyanates (D) have a higher boiling point than lower alcohols and are thus relatively nonvolatile in the process of the invention, so that volatile urethanes of this type with the diisocyanate could go over into the distillate (see below).

Examples of alkanols for this purpose are isopropanol, n-propanol, n-butanol, isobutanol, seo-butanol, tert-butanol, n-hexanol, n-heptanol, n-octanol, 2-ethylhexanol, n-decanol. Preference is given to n-butanol, isobutanol, n-hexanol, n-octanol and 2-ethylhexanol, with particular preference being given to n-butanol, n-octanol and 2-ethylhexanol, very particularly preferably n-butanol and 2-ethylhexanol, in particular 2-ethylhexanol.

Examples of monofunctional alcohols which are not alkanols are 2-methoxyethanol, 2-ethoxyethanol, 2-butoxyethanol, diethylene glycol monomethyl ether, monoethyl ether or n-butyl ether and 1,3-propanediol monomethyl ether.

Examples of alkanediols are 1,2-propanediol, ethylene glycol, 2,2-dimethyl-1,2-ethanediol, 1,3-propanediol, 1,2-butanediol, 1,2-butanediol, 1,4-butanediol, 1,5-pentanediol, 1,6-hexanediol, 2-methyl-1,3-pentanediol, 2-ethyl-1,3-hexanediol, 2-propyl-1,3-heptanediol, 2,2,4-trimethyl-1,3-pentanediol, 1,8-octanediol and 1,10-decanediol.

Based on the amount of the polyisocyanate mixture (end product), 0.25-25% by weight, preferably from 0.5 to 8% by weight, particularly preferably from 0.75 to 5% by weight and very particularly preferably 1-2% by weight, of the alcohol (A) are reacted for a period of from 5 minutes to 4 hours, preferably from 10 minutes to 3 hours, particularly preferably from 15 minutes to 2 hours and very particularly preferably from 30 minutes to 90 minutes, at a temperature of from 40 to 160° C., preferably from 60 to 120° C., particularly preferably from 80 to 100° C.

In a preferred embodiment, a plurality of alcohols, for example at least two, particularly preferably precisely two, alcohols are used in amounts of in each case less than 2% by weight, preferably not more than 1.75% by weight and particularly preferably not more than 1.5% by weight.

In a further preferred embodiment, 2-ethylhexanol is used in amounts of up to 25% by weight based on the polyisocyanate mixture, particularly preferably from 2 to 5% by weight of 2-ethylhexanol.

In a further preferred embodiment, 2-ethyl-1,3-hexanediol or 2,2,4-trimethyl-1,3-pentanediol is used in amounts of up to 25% by weight based on the polyisocyanate mixture, particularly preferably from 0.5 to 14% by weight, very particularly preferably from 3 to 8% by weight.

Preference is given to converting at least 10% of the alcohol (A) into urethane groups, particularly preferably at least 20%.

In a further variant, at least 50% of the alcohol (A) is converted into urethane groups.

Predominantly monourethanes and to a lesser extent diurethanes are preferably formed from the diisocyanate (D) and the alcohol (A). The formation of monourethanes and diurethanes generally occurs statistically as a function of the selected stochiometry of alcohol (A) to diisocyanate (D). The ratio of monourethanes to diurethanes is particularly preferably at least 60:40 (w/w), very particularly preferably at least 70:30 and in particular at least 80:20.

In a preferred embodiment, only part of the diisocyanate can firstly be reacted with alcohol (A) in reaction step (a) and a further part of diisocyanate (D) can subsequently be added before or during reaction step (b). The ratio between these two streams of the isocyanate (D) in this embodiment is from 10:1 to 1:20, preferably from 5:1 to 1:10 and particularly preferably from 2:1 to 1:3.

It is critical according to the invention that essentially only a reaction of diisocyanate (D) with the alcohol (A) to form monourethanes and/or diurethanes takes place in reaction step a) and no significant formation of other polyisocyanates, in particular isocyanate group-comprising polyisocyanates, occurs. The monourethanes and/or diurethanes formed can react in minor amounts with further diisocyanate (D) to form allophanates.

Step a) is therefore preferably carried out in the absence of a catalyst (K) (see below) which is able to catalyze the reaction of isocyanates to form isocyanurate groups.

Furthermore, step a) is, according to the invention, carried out in the absence of materials which are able to catalyze the formation of urethanes from the compounds (A) and (D) and are other than the compounds (A) and (D) and the products, by-products and intermediates formed therefrom.

The reaction temperature in step a) is preferably 40-160° C., particularly preferably 60-120° C., very particularly preferably 80-100° C.

In one process variant, the amounts of alcohol (A) and diisocyanate (D) which are to be reacted are combined in their entirety in substep a).

In another process variant, step a) of the urethanization is carried out at a higher concentration of alcohol (A) than corresponds to the entire amount of alcohols (A) and diisocyanate (D) used. For this purpose, the urethanization step a) of the alcohol with part of the diisocyanates has to be followed by introduction of further diisocyanate for the second substep b) of the formation of isocyanurate. It has surprisingly been found that the presence of urethanes in the reaction mixture has an autocatalytic effect, i.e. the relative conversion increases more quickly at a higher alcohol concentration than at a lower alcohol concentration, which can be exploited for a lower residence time of the urethanization mixture.

Since the formation of diurethanes is not desired, mixing ratios of alcohol groups to isocyanate groups which are close to the equivalence ratio are less preferred.

Thus, generally less than 20 mol % of all diisocyanates present at the beginning react in step a) to form urethane groups, preferably less than 15 mol %, particularly preferably less than 10 mol % and very particularly preferably less than 5 mol %.

Steps a) and b) can be carried out in a continuous process or in a batch process. In the continuous process, the ratio of the times of steps a) and b) can be adjusted, for example, via the length of the cascade and the reactor sizes.

At the end of reaction step a), a reaction mixture which consists essentially of unreacted diisocyanate (D) and monourethane and also small amounts of diurethane and/or allophanate of diisocyanate (D) with the alcohol (A) is obtained. Unreacted alcohol (A) can also be present as a function of the degree of conversion set.

Reaction step b) comprises reacting the reaction mixture obtained from a) in the presence of at least one catalyst (K) which is able to catalyze the reaction of isocyanates to form isocyanurate groups.

The reaction mixture obtained from a) is subsequently transferred into a separate reactor for carrying out reaction step b). As an alternative, reaction step b) can also be brought about in the same reactor as reaction step a) by addition of the catalyst (K) and adjustment of the temperature to the reaction temperature of isocyanurate formation.

Trimerization catalysts suitable for the process of the invention include, for example, alkali metal phenoxides of the type described in GB-B1, 391,066 or GB-B1,386,399;

aziridine derivates in combination with tertiary amines of the type described in U.S. Pat. No. 3,919,218;

quaternary ammonium carboxylates of the type described in the U.S. Pat. Nos. 4,454,317 and 4,801,663;

quaternary ammonium phenoxides having a zwitterionic structure of the type described in U.S. Pat. No. 4,335,219;

ammonium phosphonates and phosphates of the type described in U.S. Pat. No. 4,499,253;

alkali metal carboxylates, for example cobalt naphthenate, sodium benzoate, sodium acetate, potassium formate, as described in DE-A 3,219,608;

basic alkali metal salts complexed by acyclic organic compounds, as described in U.S. Pat. No. 4,379,905, for instance sodium acetate complexed with a polyethylene glycol comprising an average of from 5 to 8 ethylene oxide units;

basic alkali metal salts complexed with crown ethers, as described in U.S. Pat. No. 4,487,928;

mixtures of alkali metal fluorides and quaternary ammonium or phosphonium salts as described in EP-A 355479; EP 798299 B1 or EP 896009 B1 for preparing mixtures of isocyanurate with unsymmetrical isocyanurates, iminooxodiazinedione, tertiary amines, for example triethylamine, N,N-dimethybenzylamine, triethylenediamine, tris-2,4,6-(dimethylaminomethyl)phenol and tris-1,3,5-(dimethylaminopropyl)-s-hexahydrotriazine, N-heterocyclic carbenes (NHCs) as in WO 2005/113626, alkali metal oxides, alkali metal hydroxides and strong organic bases, e.g. alkali metal alkoxides, tin, zinc and lead salts of alkylcarboxylic acids, organic metal salts of the formula $(A)_n$-R—O—CO—$O^{\ominus}M^{\oplus}$ as described in U.S. Pat. No. 3,817,939, where:

A is a hydroxyl group or a hydrogen atom, n is from 1 to 3,

R is a polyfunctional linear or branched, aliphatic or aromatic hydrocarbon radical and $M^{\oplus}$ is a cation, e.g. an alkali metal cation or a quaternary ammonium cation such as tetraalkylammonium, and quaternary hydroxyalkylammonium compounds of the formula

as catalyst as described in DE-A-26 31 733 (U.S. Pat. No. 4,040,992).

Particularly useful catalysts for the process are quaternary ammonium salts corresponding to the formula

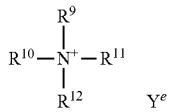

where
$Y^{\oplus}$=carboxylate ($R^{13}COO^-$), fluoride ($F^-$), carbonate ($R^{13}O(CO)O^-$) or hydroxide ($OH^-$),
as are described for $Y^-=OH^-$ in U.S. Pat. No. 4,324,879 and the German first publications 2,806,731 and 2,901,479.

The radical $Y^{\ominus}$ is preferably a carboxylate, carbonate or hydroxide, particularly preferably a carboxylate or hydroxide and very particularly preferably a carboxylate.

$R^{13}$ therein is hydrogen, $C_1$-$C_{20}$-alkyl, $C_6$-$C_{12}$-aryl or $C_7$-$C_{20}$-arylalkyl, each of which may optionally be substituted.

$R^{13}$ is preferably hydrogen or $C_1$-$C_8$-alkyl.

If a catalyst having a hydroxide ion as anion is used in the process of the invention, the reaction is preferably carried out at a reduced content of carbon dioxide ($CO_2$), for example a content of less than 20 ppm, preferably less than 10 ppm and particularly preferably less than 5 ppm, as described in EP 330966 A2.

Preferred quaternary ammonium salts are those in which the radicals $R^9$ to $R^{12}$ are identical or different alkyl groups which have from 1 to 20, preferably from 1 to 4, carbon atoms and are optionally substituted by hydroxyl or phenyl groups.

Two of the radicals $R^9$ to $R^{12}$ together with the nitrogen atom and, if appropriate, a further nitrogen or oxygen atom can also form a heterocyclic, 5-, 6- or 7-membered ring. The radicals $R^9$ to $R^{11}$ can in each case also be ethylene radicals which together with the quaternary nitrogen atom and a further tertiary nitrogen atom form a bicyclic triethylenediamine structure, provided that the radical $R^{12}$ is then a hydroxylalkyl group which has from 2 to 4 carbon atoms and is preferably located in the 2 position relative to the quaternary nitrogen atom. The hydroxy-substituted radical or radicals can also comprise other substituents, for example $C_1$-$C_4$-alkyloxy substituents.

The ammonium ions can also be part of a ring system having one or more rings, for example derived from piperazine, morpholine, piperidine, pyrrolidine, quinuclidine or di-aza-bicyclo[2.2.2]octane.

Examples of groups $R^9$ to $R^{12}$ having from 1 to 20 carbon atoms are, independently of one another, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hetadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, chloromethyl, 2-chloroethyl, trichloromethyl, trifluoromethyl, 1,1-dimethyl-2-chloroethyl, 2-methoxyisopropyl, 2-ethoxyethyl, 2-hydroxyethyl, 2-hydroxypropyl, 3-hydroxypropyl, 4-hydroxybutyl, 6-hydroxyhexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, methylnaphthyl, isopropylnaphthyl, chloronaphthyl, 2,6-dimethylphenyl, 2,4,6-trimethylphenyl, 2,6-dimethoxyphenyl, 2,6-dichlorophenyl, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, chlorocyclohexyl, dichlorocyclohexyl, dichlorocyclopentyl, norbornyl or norbornenyl.

The radicals $R^9$ to $R^{12}$ are preferably, independently of one another, $C_1$-$C_4$-alkyl. $R^{12}$ can additionally be benzyl or a radical of the formula

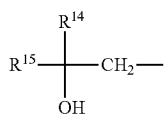

where $R^{14}$ and $R^{15}$ can each be, independently of one another, hydrogen or $C_1$-$C_4$-alkyl.

Particularly preferred radicals $R^9$ to $R^{12}$ are, independently of one another, methyl, ethyl and n-butyl and in the case of $R^{12}$ additionally benzyl, 2-hydroxyethyl and 2-hydroxypropyl.

The following catalysts can preferably be used for the process of the invention:
quaternary ammonium hydroxides, preferably N,N,N-trimethyl-N-benzylammonium hydroxide and N,N,N-trimethyl-N-(2-hydroxypropyl)ammonium hydroxide, as described in DE-A-38 06 276, with the proviso that the process is then preferably carried out at a reduced content of carbon dioxide.
Hydroxyalkyl-substituted quaternary ammonium hydroxides as described in EP-A-10 589 (U.S. Pat. No. 4,324,879).

In the present text,
$C_1$-$C_{20}$-alkyl which is optionally substituted by aryl, alkyl, aryloxy, alkyloxy, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hetadecyl, octadecyl, eicosyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, $C_6$-$C_{12}$-aryl which is optionally substituted by aryl, alkyl, aryloxy, alkyloxy, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which is optionally substituted by aryl, alkyl, aryloxy, alkyloxy, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, divalent $C_2$-$C_9$-alkylene radicals which may also be constituent of an arylene or cycloalkylene radical are, for example, 1,2-ethylene, 1,2-propylene, 1,3-propylene, 1,6-hexylene, 2,2,4-trimethylhexylene, 1,4-cyclohexylene, isopropylidene-1,4-dicyclohexylene, 1,2-1,3- or 1,4-phenylene, 4,4'-biphenylene, 4,4'-bisphenylmethylene, 1,3-, 1,4- or 1,5-naphthylene, 3,3'-dimethyl-4,4'-diphenylene, 3,3'-dichloro-4,4'-diphenylene, 2,4- or 2,6-pyridyl, 1,4-anthraquinonediyl, m- or p-tolylene, 4,6-dimethyl-1,3-phenylene, 4,6-dichloro-1,3-phenylene, 5-chloro-1,3-phenylene, 5-hydroxy-1,3-phenylene, 5-methoxy-1,3-phenylene, 2,3-dimethyl-1,4-phenylene, m- or p-xylylene, methylenedi-p-phenylene, isopropylidenedi-p-phenylene, thiodi-p-phenylene, dithiodi-p-phenylene, sulfodi-p-phenylene, carbonyldi-p-phenylene, and $C_1$-$C_4$-alkyl is, for example, methyl, ethyl, propyl, isopropyl, n-butyl, sec-butyl or tert-butyl, preferably methyl, ethyl or n-butyl, particularly preferably methyl or ethyl and very particularly preferably methyl.

The preparation of these quaternary ammonium catalysts is carried out in a known manner, for example by reaction of a tertiary amine with an alkylene oxide in an aqueous-alcoholic medium (cf. U.S. Pat. No. 3,995,997, column 2, lines 19-44).

Examples of suitable tertiary amines are trimethylamine, tributylamine, 2-dimethylaminoethanol, triethanolamine, dodecyldimethylamine, N,N-dimethylcyclohexylamine, N-methylpyrrolidine, N-methylmorpholine and 1,4-diazabicyclo[2.2.2]octane. Examples of suitable alkylene oxides are ethylene oxide, propylene oxide, 1,2-butylene oxide, styrene oxide and methoxypropylene, ethoxypropylene or phenoxypropylene oxide.

The most preferred catalysts (K) are N-(2-hydroxypropyl)-N,N,N-trimethylammonium 2-ethylhexanoate (DABCO TMR®) and N-(2-hydroxypropyl)-N,N,N-trimethylammonium 2-formate (DABCO TMR®-2) from Air Products.

Preference is also given to trimerization catalysts as are known from DE 10 2004 012571 A1, there in particular paragraphs [0017] to [0027], and from EP-A1668 271, there in particular from page 4, line 16 to page 6, line 47, which are hereby incorporated by reference into the present disclosure.

The catalysts (K) are generally used in amounts of up to 1000 ppm by weight, preferably from about 5 to 500 ppm by weight, particularly preferably from 10 to 100 ppm by weight, based on the isocyanate used.

The catalysts can be used in pure form or in solution. To aid handling, the catalyst can be dissolved in a solvent. Suitable solvents for this purpose are, for example, alcohols, in particular diols, ketones, ethers and esters. The solvents mentioned in this text which are inert toward isocyanate groups are suitable as solvents, depending on the type of catalyst. Dimethylformamide or dimethyl sulfoxide can likewise be used as solvents for the catalysts.

For example, the abovementioned catalysts DABCO TMR® and DABCO TMR®-2 are preferably used as an about 33-75% strength by weight solution in diethylene glycol, dipropylene glycol, ethylene glycol or ethylene glycol monomethyl ether. It is also possible to use the catalysts in a dilute or concentrated formulation.

It is also conceivable to use alcohol (A) as is used in step a) as solvent, preferably 2-ethylhexanol, 2-ethyl-1,3-hexanediol or 2,2,4-trimethyl-1,3-pentanediol.

The reaction in reaction step b) is generally carried out for a period of from 5 minutes to 4 hours, preferably from 10 minutes to 3 hours, particularly preferably from 15 minutes to 2 hours and very particularly preferably from 30 minutes to 90 minutes, at a temperature of from 40 to 140° C., preferably from 50 to 120° C., particularly preferably from 60 to 100° C.

When reaction step b) is carried out, a further reaction of unreacted alcohol (A) from reaction step a) or from the solvent for the catalyst (K) in step b) with diisocyanate (D) to form urethane and possibly a further reaction to form an allophanate group-comprising polyisocyanate can take place.

After the desired degree of trimerization of the reaction mixture has been achieved in b), the trimerization reaction is stopped by deactivating the trimerization catalyst in reaction step c). Reaction step c) comprises the deactivation of the catalyst (K) from step b) by addition of a catalyst poison (S). The degree of reaction can be selected as a function of the alcohol (A), diisocyanate (D) and the ratio thereof and also of the desired target viscosity of the polyisocyanate mixture.

The product comprises, in addition to unreacted monomeric diisocyanate (D), compounds which have one or more isocyanurate structures. Compounds of this type are described in the literature.

Furthermore, polyisocyanates comprising urethane and/or allophanate groups can also be formed.

When specific fluoride catalysts are used, part of the isocyanurate structures can also be present in unsymmetrical form as iminooxadiazinedione.

The reaction is preferably carried out so that predominantly isocyanurate group-comprising polyisocyanates are formed as polyisocyanates. It is possible for, for example, uretdione group-comprising polyisocyanates to be formed in minor amounts, preferably not more than 10% by weight, particularly preferably not more than 5% by weight and very particularly preferably not more than 2% by weight, in particular not more than 1.5% by weight.

Suitable deactivators (S) are in principle inorganic acids such as hydrogen chloride, phosphorous acid or phosphoric acid, carboxylic acid halides such as acetyl chloride or benzoyl chloride, sulfonic acids or sulfonic esters, e.g. methanesulfonic acid, p-toluenesulfonic acid, methyl or ethyl p-toluenesulfonate, m-chloroperbenzoic acid and preferably dialkyl phosphates such as di-2-ethylhexyl phosphate and dibutyl phosphate.

However, these deactivators have the disadvantage that in combination with the catalysts used they often lead to precipitates or turbidity, as is known from DE 3810908 C2, which requires complicated after-treatment of the products.

According to the invention, compounds (S) of the formula $$\underset{(S)}{\overset{Z}{\underset{R^1}{\overset{\|}{X}}}\overset{}{\underset{}{C}}\overset{H}{\underset{R^2}{N}}}$$

where $R^1$ and $R^2$ are each, independently of one another, hydrogen or $C_1$-$C_{20}$-alkyl, $C_6$-$C_{12}$-aryl or $C_5$-$C_{12}$-cycloalkyl, which may each optionally be substituted by aryl, alkyl, aryloxy, alkyloxy, heteroatoms and/or heterocycles, where when X=O or S, $R^1 \neq H$, and $R^1$ and $R^2$ together with the group X—(CO)—NH can also form a 5- to 12-membered ring, with $R^1$ and $R^2$ together forming an optionally substituted divalent $C_2$-$C_9$-alkylene radical which can also be part of an arylene or cycloalkylene radical, Z is oxygen (O) or sulfur (S), preferably oxygen, X is oxygen (O), sulfur (S), imino (NH) or substituted imino (NR$^3$) and $R^3$ is $C_1$-$C_4$-alkyl, where the radical $R^1$ in the case of the compounds (S) has at least one group which is reactive toward isocyanate, are used as deactivators for the catalyst (K).

In these compounds (S):

X can preferably be O, NH or NR$^3$, particularly preferably O or NH and very particularly preferably O.

According to the invention, it is critical in the case of the compounds (S) that the radical $R^1$ has at least one group which is reactive toward isocyanate.

When the radicals $R^1$ and $R^2$ are joined to one another, the compound (S) is preferably a cyclic urea (X=NH or NR$^3$)

$$\underset{R^{16}}{\overset{Z}{\underset{}{\overset{\|}{X}}}\overset{}{\underset{}{C}}\overset{NH}{\underset{}{}}}$$

or an oxazolidinone (X=O), $$\underset{R^{17}}{\overset{Z}{\underset{O}{\overset{\|}{}}}\overset{NH}{\underset{}{}}}$$

where

Z is oxygen (O) or sulfur (S), preferably oxygen, $R^{16}$ is a $C_2$-$C_6$-alkylene substituted by at least one group which is reactive toward isocyanate and $R^{17}$ is straight-chain or branched $C_1$-$C_4$-alkyl which is substituted by at least one group which is reactive toward isocyanate.

Preferred oxazolidinones are those in which $R^{17}$ is 4-hydroxyphenylmethyl, 3-indolylmethyl, carboxymethyl, 2-carboxyethyl, amidocarboxymethyl, 2-amidocarboxyethyl, hydroxymethyl, 1-hydroxyethyl, thiomethyl, 4-aminobutyl, 3-guanidinopropyl or (1,3-imidazol-4-yl)methyl.

Furthermore, it is possible to use carbamates which can be obtained by 1) reaction of an amine (M) with a carbonate (C) and
2) if appropriate, purification of the reaction mixture which can be obtained from 1), as compounds (S).

Amines are ammonia or primary amines, and carbonates are O,O'-disubstituted carbonates having the structural element —O—C(=O)—O—.

Very particularly preferred compounds (S) are those which can be obtained by a reaction according to scheme (III), $$\underset{R^{19}}{\overset{R^{18}}{\underset{}{N}}}\!\!-\!\!H \;+\; \underset{Y}{\overset{O}{\underset{O}{\overset{\|}{\underset{}{C}}}}} \;\longrightarrow\; \underset{R^{19}}{\overset{R^{18}}{\underset{}{N}}}\overset{O}{\underset{}{\overset{\|}{C}}}\,O\!\!-\!\!Y\!\!-\!\!OH$$

where $R^{18}$ is hydrogen, $R^{19}$ is hydrogen, $C_1$-$C_{20}$-alkyl, $C_2$-$C_{20}$-alkyl which is optionally interrupted by one or more oxygen and/or sulfur atoms and/or one or more substituted or unsubstituted imino groups, $C_2$-$C_{18}$-alkenyl, $C_6$-$C_{12}$-aryl, $C_5$-$C_{12}$-cycloalkyl or a 5- or 6-membered, oxygen-, nitrogen- and/or sulfur-comprising heterocycle, where the radicals mentioned may each be substituted by aryl, alkyl, aryloxy, alkyloxy, heteroatoms and/or heterocycles, Y is $C_2$-$C_{20}$-alkylene, $C_5$-$C_{12}$-cycloalkylene or $C_2$-$C_{20}$-alkylene interrupted by one or more oxygen and/or sulfur atoms and/or one or more substituted or unsubstituted imino groups and/or by one or more cycloalkyl, —(CO)—, —O(CO)O—, —(NH)(CO)O—, —O(CO) (NH)—, —O(CO)— or —(CO)O— groups, where the radicals mentioned may each be substituted by aryl, alkyl, aryloxy, alkyloxy, heteroatoms and/or heterocycles.

$R^{19}$ is preferably hydrogen, $C_1$-$C_{12}$-alkyl or $C_5$-$C_6$-cycloalkyl and is particularly preferably hydrogen, $C_1$-$C_4$-alkyl or $C_5$-$C_6$-cycloalkyl and very particularly preferably hydrogen or $C_1$-$C_4$-alkyl.

Y is preferably $C_2$-$C_{10}$-alkylene, particularly preferably $C_2$-$C_6$-alkylene, very particularly preferably $C_2$-$C_4$-alkylene, in particular $C_2$-$C_3$-alkylene and especially $C_2$-alkylene, where the radicals mentioned may each be substituted by aryl, alkyl, aryloxy, alkyloxy, heteroatoms and/or heterocycles.

Examples of $R^{19}$ are hydrogen, methyl, ethyl, isopropyl, n-propyl, n-butyl, isobutyl, sec-butyl, tert-butyl, n-hexyl, n-heptyl, n-octyl, n-decyl, n-dodecyl, n-tetradecyl, n-hexadecyl, n-octadecyl, n-eicosyl, 2-ethylhexyl, cyclopentyl, cyclohexyl, cyclooctyl, cyclododecyl, 2-hydroxyethyl, 2-hydroxypropyl and 1-hydroxypropyl.

Examples of Y are 1,2-ethylene, 1,2-propylene, 1,1-dimethyl-1,2-ethylene, 1-hydroxy methyl-1,2-ethylene, 2-hydroxy-1,3-propylene, 1,3-propylene, 1,4-butylene, 1,6-hexylene, 2-methyl-1,3-propylene, 2-ethyl-1,3-propylene, 2,2-dimethyl-1,3-propylene and 2,2-dimethyl-1,4-butylene, with preference being given to 1,2-ethylene, 1,2-propylene, 1,3-propylene, particularly preferably 1,2-ethylene and 1,2-propylene and very particularly preferably 1,2-ethylene.

Examples of amines (M) are ammonia, methylamine, ethylamine, isopropylamine, n-butylamine, tert-butylamine, monoethanolamine, diethanolamine, propanolamine, cyclopentylamine, cyclohexylamine, aniline, ethylenediamine, diethylenetriamine, triethylenetetramine and tetraethylenepentamine.

Examples of carbonates (C) are ethylene carbonate, 1,3-propylene carbonate, 1,2-pro-pylene carbonate and glyceryl carbonate (4-hydroxymethylethylene carbonate).

The reaction of an amine (M) with a carbonate (C) is known per se, for example from U.S. Pat. No. 4,820,830, column 4, line 44 to column 5, line 9, and is not restricted.

The amine (M) and the carbonate (C) are typically reacted with one another in a stochiometry of from 0.7 to 1.2 mol of amine: 1 mol of carbonate, preferably 0.8-1.2:1, particularly preferably 0.9-1.1:1, very particularly preferably 0.95-1.1:1 and in particular 1:1 mol/mol.

The reaction is generally carried out at a temperature of from 0 to 120° C., particularly preferably from 20 to 100° C., very particularly preferably from 30 to 80° C. and very particularly preferably from 40 to 80° C.

The reaction is generally complete within 12 hours, preferably within from 15 minutes to 10 hours, particularly preferably in from 30 minutes to 8 hours, very particularly preferably from 45 minutes to 6 hours and in particular within from 1 to 4 hours.

The reaction can be carried out without solvent or in the presence of a solvent, for example alcohols, ethers, ketones, hydrocarbons or water, preferably without solvent.

The reaction mixture which can be obtained from 1) can, if desired, be purified in a further step 2), for example by filtration, distillation, rectification, chromatography, treatment with ion exchangers, adsorbents, a neutral, acid and/or alkaline scrub, stripping or crystallization.

Particular preference is given to compounds (S) in which the radicals $R^1$ and $R^2$ are not joined to one another.

$R^1$ and $R^2$ are preferably selected independently from the group consisting of hydrogen and optionally substituted $C_1$-$C_4$-alkyl, as long as at least one of these radicals has at least one group which is reactive toward isocyanate.

Here, $R^1 \neq H$ when $X = O$ or S.

Radicals $R^1$ or $R^2$ which bear a group which is reactive toward NCO are, for example, radicals bearing mercapto, amino, monosubstituted amino or hydroxy groups, particularly preferably radicals bearing a hydroxy group, very particularly preferably radicals which bear a hydroxy group in the 2 position. The 2-hydroxypropyl radical can bear the methyl group in the 1 position or the 2 position or be any mixture of the isomers.

In particular, the radical $R^1$ is selected from the group consisting of 2-hydroxyethyl and 2-hydroxypropyl.

Preferred compounds (S) are O-2-hydroxyethyl carbamate, O-3-hydroxypropyl carbamate and O-2-hydroxypropyl carbamate.

To aid meterability, it can be useful to dissolve the compound (S) in at least one solvent, for example one of the solvents mentioned above or preferably in an alcohol, particularly preferably an alkanol, for example as an at least 5% strength by weight solution, preferably at least 10% strength by weight, particularly preferably at least 15% strength by weight and very particularly preferably at least 20% strength by weight.

The upper limit is determined purely by the solubility limit of (S) in the solvent.

To stop the reaction, the compound (S) is used in a molar ratio to the catalyst of from 0.5 to 10, preferably 0.6-5, very particularly preferably 0.8-3.

The deactivator is generally added at the reaction temperature.

In reaction step d), the unreacted diisocyanate (D) is separated off from the reaction mixture obtained in this way from c).

The reaction mixture comprising polyisocyanates prepared in this way from step c) is finally freed of any solvents or diluents present and/or preferably of excess, unreacted isocyanates in a manner known per se in a step d), for example by thin film distillation at a temperature of from 90 to 220° C., if appropriate under reduced pressure, if appropriate with additional passage of inert stripping gas, so that the isocyanurate group-comprising polyisocyanates can be obtained with a content of monomeric isocyanates of, for example, less than 1.0% by weight, preferably less than 0.5% by weight, particularly preferably less than 0.3% by weight.

Apparatuses which can be used for this purpose are flash evaporators, falling film evaporators, thin film evaporators and/or short path evaporators, each of which can, if appropriate, be superposed by a short column.

The distillate of monomeric isocyanate which is separated off is preferably recirculated to step a) and, supplemented by fresh isocyanate, reused in the reaction.

e) Optional ozonolysis of the distillation bottoms obtained from d)

To reduce the color number, the isocyanurate group-comprising polyisocyanate mixture can optionally be treated with an ozone-comprising gas. This is most simply carried out by passing an ozone-comprising gas through the isocyanurate group-comprising polyisocyanate.

The gas stream can preferably comprise up to 20% by volume of ozone.

The reaction temperature when ozone is introduced should be from 5° C. to 170° C., preferably from 25° C. to 100° C.

It is advantageous to work in the preferred average temperature range since at lower temperatures decoloration proceeds very slowly and at higher temperatures partial redissociation of the oligomers can occur.

The ozone treatment is carried out at atmospheric pressure or a slightly superatmospheric pressure up to about 200 kPa. The reaction times are generally from 5 minutes to 30 minutes. The optimal reaction time can easily be determined by means of a few preliminary tests.

Oligomerization products having low color numbers can also be lightened further.

The viscosity of the finished product is in principle not subject to any restrictions. It is usually up to 30 000 mPa*s, preferably up to 10 000 mPas (based on the polyisocyanate mixture without solvent). At high viscosities which would restrict the application of the polyisocyanates obtained, the polyisocyanate mixture is preferably diluted with a solvent or solvent mixture.

In a preferred embodiment, a viscosity of 2500-4000, in particular 2500-3500, is obtained.

In a further preferred embodiment, a viscosity below 1300 mPa*s, in particular <700 mPas, in particular <350 mPas, is obtained. In the present text, the viscosity is reported at 23° C.

in accordance with DIN EN ISO 3219/A.3 using a cone-and-plate system at a shear rate of 1000 s$^{-1}$, unless indicated otherwise.

The finished product can then, after the unreacted isocyanate (D) has been separated off, finally be formulated, if desired, with at least one solvent.

Examples of such solvents are aromatic and/or (cyclo)aliphatic hydrocarbons and mixtures thereof, halogenated hydrocarbons, esters and ethers.

Preference is given to aromatic hydrocarbons, (cyclo)aliphatic hydrocarbons, alkyl alkanoates, alkoxylated alkyl alkanoates and mixtures thereof.

Particular preference is given to monoalkylated or polyalkylated benzenes and naphthalenes, alkyl alkanoates and alkoxylated alkyl alkanoates and also mixtures thereof.

As aromatic hydrocarbon mixtures, preference is given to mixtures which comprise predominantly aromatic $C_7$-$C_{14}$-hydrocarbons and can comprise a boiling range from 110 to 300° C., with particular preference being given to toluene, o-, m- or p-xylene, trimethylbenzene isomers, tetramethylbenzene isomers, ethylbenzene, cumene, tetrahydronaphthalene and mixtures comprising such hydrocarbons.

Examples are the Solvesso® brands from ExxonMobil Chemical, in particular Solvesso® 100 (CAS No. 64742-95-6, predominantly $C_9$- and $C_{10}$-aromatics, boiling range about 154-178° C.), 150 (boiling range about 182-207° C.) and 200 (CAS No. 64742-94-5), and the Shellsol® brands from Shell, Caromax® (e.g. Caromax® 18) from Petrochem Carless and Hydrosol from DHC (e.g. as Hydrosol® A 170). Hydrocarbon mixtures of paraffins, cycloparaffins and aromatics are also commercially available under the names Kristallöl (for example Kristallöl 30, boiling range about 158-198° C. or Kristallöl 60: CAS No. 64742-82-1), petroleum spirit (for example likewise CAS No. 64742-82-1) or solventnaphtha (light: boiling range about 155-180° C., heavy: boiling range about 225-300° C.). The aromatics content of such hydrocarbon mixtures is generally above 90% by weight, preferably above 95% by weight, particularly preferably above 98% by weight and very particularly preferably above 99% by weight. It can be useful to employ hydrocarbon mixtures having a particularly low content of naphthalene.

The content of aliphatic hydrocarbons is generally less than 5% by weight, preferably less than 2.5% by weight and particularly preferably less than 1% by weight.

Halogenated hydrocarbons are, for example, chlorobenzene and dichlorobenzene or isomer mixtures thereof.

Esters are, for example, n-butyl acetate, ethyl acetate, 1-methoxypropyl 2-acetate and 2-methoxyethyl acetate.

Ethers are, for example, THF, dioxane and the dimethyl, diethyl or di-n-butyl ethers of ethylene glycol, diethylene glycol, triethylene glycol, propylene glycol, dipropylene glycol or tripropylene glycol.

(Cyclo)aliphatic hydrocarbons are, for example, decalin, alkylated decalin and isomer mixtures of straight-chain or branched alkanes and/or cycloalkanes, for example petroleum ether or ligroin.

Further preference is given to n-butyl acetate, ethyl acetate, 1-methoxypropyl 2-acetate, 2-methoxyethyl acetate and mixtures thereof, in particular with the abovementioned aromatic hydrocarbon mixtures.

Such mixtures can be made up in a volume ratio of from 5:1 to 1:5, preferably a volume ratio of from 4:1 to 1:4, particularly preferably a volume ratio of from 3:1 to 1:3 and very particularly preferably a volume ratio of from 2:1 to 1:2.

Preferred examples are butyl acetate/xylene, methoxypropyl acetate/xylene 1:1, butyl acetate/solventnaphtha 100 1:1, butyl acetate/Solvesso® 100 1:2 and Kristallöl 30/Shellsol® A 3:1.

Furthermore, it is possible to admix the polyisocyanates obtained according to the invention, if appropriate in solvents and if appropriate provided with other surface coating additives, with a stabilizer, preferably with at least one stabilizer selected from the group consisting of phosphites, phosphonates, phosphonites, thio compounds and sterically hindered phenols.

Phosphites are compounds of the formula

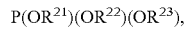

where
$R^{21}$, $R^{22}$ and $R^{23}$ can each be, independently of one another, $C_1$-$C_{20}$-alkyl, $C_6$-$C_{12}$-aryl or $C_5$-$C_{12}$-cycloalkyl, where the radicals mentioned may each be substituted by aryl, alkyl, aryloxy, alkyloxy, heteroatoms and/or heterocycles.

Preferred radicals $R^{21}$, $R^{22}$ and $R^{23}$ are $C_6$-$C_{12}$-aryl, in particular phenyl, and $C_1$-$C_{20}$-alkyl, in particular $C_1$-$C_4$-alkyl, which may each optionally be substituted by aryl, alkyl, aryloxy, alkyloxy, heteroatoms and/or heterocycles.

Particularly preferred phosphites are triphenyl phosphite, tri(n-butyl)phosphite, tri(octyl)phosphite, tri(nonylphenyl) phosphite, tri(2,4-di-tert-butyl phenyl)phosphite.

Phosphonates are compounds of the formula

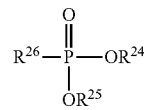

where
$R^{24}$, $R^{25}$ and $R^{26}$ can each be, independently of one another, $C_1$-$C_{20}$-alkyl, $C_6$-$C_{12}$-aryl or $C_5$-$C_{12}$-cycloalkyl, where the radicals mentioned may each be substituted by aryl, alkyl, aryloxy, alkyloxy, heteroatoms and/or heterocycles, and $R^{26}$ can additionally be hydrogen.

The phosphonates can be mononuclear or polynuclear, aliphatically, cycloaliphatically and/or aromatically substituted phosphonates.

For the purposes of the present invention, "polynuclear" phosphonates are compounds which bear a plurality of phosphonate groups, i.e. singularly organically substituted phosphorus atoms which in turn bear two organically substituted oxygen atoms and one unsubstituted oxygen atom, within one molecule.

Preferred radicals $R^{24}$ and $R^{25}$ are, independently of one another, $C_1$-$C_{20}$-alkyl which is optionally substituted by aryl, alkyl, aryloxy, alkyloxy, heteroatoms and/or heterocycles or $C_6$-$C_{12}$-aryl which is optionally substituted by aryl, alkyl, aryloxy, alkyloxy, heteroatoms and/or heterocycles, particularly preferably $C_6$-$C_{12}$-aryl which is optionally substituted by aryl, alkyl, aryloxy, alkyloxy, heteroatoms and/or heterocycles and in particular phenyl or sterically hindered aryl.

For the purposes of the present text, the term "sterically hindered" means that at least one ortho position, preferably both ortho positions, relative to the functional group bear(s) a tert-butyl group.

$R^{24}$ and $R^{25}$ are preferably selected independently from the group consisting of n-butyl, phenyl and benzyl.

$R^{24}$ and $R^{25}$ are particularly preferably identical.

The radical $R^{26}$ is preferably hydrogen.

Phosphonites are compounds of the formula $$P(OR^{27})(OR^{28})(R^{29}),$$

where
$R^{27}$, $R^{28}$ and $R^{29}$ can each be, independently of one another, $C_1$-$C_{20}$-alkyl, $C_6$-$C_{12}$-aryl and $C_5$-$C_{12}$-cycloalkyl, where the radicals mentioned may each be substituted by aryl, alkyl, aryloxy, alkyloxy, heteroatoms and/or heterocycles.

The phosphonites can be mononuclear or polynuclear, aliphatically, cycloaliphatically and/or aromatically substituted phosphonites.

For the purposes of the present invention, "polynuclear" phosphonites are those which bear a plurality of phosphonite groups, i.e. singularly organically substituted phosphorus atoms which in turn bear two organically substituted oxygen atoms, within one molecule.

Preferred radicals $R^{27}$ and $R^{28}$ are $C_6$-$C_{12}$-aryl which is optionally substituted by aryl, alkyl, aryloxy, alkyloxy, heteroatoms and/or heterocycles, in particular phenyl or sterically hindered aryl.

Preferred radicals $R^{29}$ are $C_6$-$C_{12}$-aryl which is optionally substituted by aryl, alkyl, aryloxy, alkyloxy, heteroatoms and/or heterocycles, in particular phenyl and p-tolyl.

Examples of further compounds of this type and of corresponding bisthio compounds may be found in U.S. Pat. No. 4,075,163, which are hereby incorporated by reference into the present application.

In the case of a binuclear phosphonite, preference is given to the phosphonite groups being joined to one another via a 4,4'-biphenylene unit. Preference is given to the compound tetrakis(2,4-di-tert-butylphenyl) 4,4'-diphenylenediphosphonite [CAS No. 119345-01-6], which is commercially available, for example, under the trade names Irgafos® P-EPQ from Ciba Spezialitätenchemie and Hostanox® P-EPQ from Clariant, and has the structural formula (where R═H):

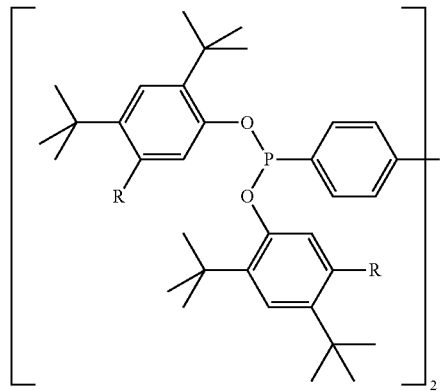

Tetrakis(2,4-di-tert-butylphenyl) 4,4'-diphenylenediphosphonite is readily available industrially and is used as antioxidant for thermoplastics.

Tetrakis(2,4-di-tert-butylphenyl) 4,4'-diphenylenediphosphonite is very readily soluble in organic solvents. However, due to the method of production, it comprises chlorine-comprising secondary components which can lead to turbidity. These chlorine-comprising secondary components can be largely extracted from an organic solution by, for example, extraction of these compounds with water, for example with hexane or methylene chloride against water or a saturated sodium chloride solution, and the organic solution can subsequently be dried, for example, over magnesium sulfate.

Such purified forms of this compound are very particularly preferred for the process of the invention, since turbidity in the polyisocyanate compositions according to the invention or in the finished surface coating compositions is undesirable.

Preference is also given to the compound tetrakis(2,4-di-tert-butyl-5-methylphenyl) [1,1'-biphenyl]-4,4'-diylbisphosphonite (or alternatively tetrakis(2,4-di-tert-butyl-5-methylphenyl) 4,4'-diphenylenediphosphonite), which is marketed under the trade name GSY-P 101 by API Corporation or Yoshitomi and has the above structural formula with R=methyl.

The two latter compounds are toxicologically unproblematical, virtually odorless compared to phosphites and stable to hydrolysis, meaning that they are advantageous from a health and occupational hygiene point of view.

Thio compounds are compounds which comprise at least one thioether group, i.e. a sulfur atom which is substituted by two identical or different organic substituents. Preference is given to thioethers of the formula $$R^{31}\text{—S—}R^{32}$$

where
$R^{31}$ and $R^{32}$ can each be, independently of one another, $C_1$-$C_{20}$-alkyl, $C_2$-$C_{18}$-alkyl which is optionally interrupted by one or more oxygen and/or sulfur atoms and/or one or more substituted or unsubstituted imino groups, $C_2$-$C_{18}$-alkenyl, $C_6$-$C_{12}$-aryl, $C_5$-$C_{12}$-cycloalkyl or a five- or six-membered, oxygen-, nitrogen- and/or sulfur-comprising heterocycle, where the radicals mentioned may each be substituted by aryl, alkyl, aryloxy, alkyloxy, heteroatoms and/or heterocycles.

Here,
$C_2$-$C_{18}$-alkyl which is optionally interrupted by one or more oxygen and/or sulfur atoms and/or one or more substituted or unsubstituted imino groups is, for example, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapenta-decyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxa-octyl, 11-ethoxy-3,6,9-trioxaundecyl, 7-ethoxy-4-oxaheptyl, 11-ethoxy-4,8-dioxa-undecyl, 15-ethoxy-4,8,12-trioxapentadecyl, 9-ethoxy-5-oxanonyl or 14-ethoxy-5,10-oxatetradecyl.

Number of oxygen and/or sulfur atoms and/or imino groups is not subject to any restrictions. In general, there will be no more than 5 in the radical, preferably no more than 4 and very particularly preferably no more than 3.

Furthermore, there is generally at least one carbon atom, preferably at least two carbon atoms, between each two heteroatoms.

Substituted and unsubstituted imino groups can be, for example, imino, methylimino, isopropylimino, n-butylimino or tert-butylimino.

Furthermore,
$C_2$-$C_{18}$-alkenyl which is optionally substituted by aryl, alkyl, aryloxy, alkyloxy, heteroatoms and/or heterocycles is, for example, vinyl, 1-propenyl, allyl, methallyl, 1,1-dimethylallyl, 2-butenyl, 2-hexenyl, octenyl, undecenyl, dodecenyl, octadecenyl, 2-phenylvinyl, 2-methoxyvinyl, 2-ethoxyvinyl, 2-methoxyallyl, 3-methoxyallyl, 2-ethoxyallyl, 3-ethoxyallyl or 1- or 2-chlorovinyl, $C_6$-$C_{12}$-aryl which is optionally substituted by aryl, alkyl, aryloxy, alkyloxy, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which is optionally substituted by aryl, alkyl, aryloxy, alkyloxy, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, and a five- or six-membered, oxygen-, nitrogen- and/or sulfur-comprising heterocycle is, for example, furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl.

Preferred thioethers are: 2-methyl-1-propenyl tert-dodecyl thioether, cyclohexylidenemethyl n-dodecyl thioether, 3-cyclohexen-(1)-ylidenemethyl-n-octadecyl thioether, 3-cyclohexen-(1)-ylidenemethyl-n-dodecyl thioether, 3-cyclohexen-(1)-ylidenemethyl n-octyl thioether, 3-cyclohexen-(1)-ylidenemethyl cyclohexyl thioether, 3-methyl-(3)-cyclohexen-(1)-ylidenemethyl n-dodecyl thioether, 3-cyclohexen-(1)-ylidenemethyl p-tolyl thioether, 3-cyclohexen-(1)-ylidenemethyl benzyl thioether and preferably 3-cyclohexen-(1)-ylidenemethyl n-dodecyl thioether and 1-hexenyl-n-dodecyl thioether.

Particularly preferred thioethers are those of the formula

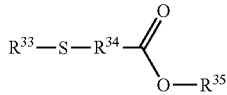

where
$R^{33}$ and $R^{35}$ can each be, independently of one another, $C_1$-$C_{20}$-alkyl, $C_2$-$C_{20}$-alkyl, which is optionally interrupted by one or more oxygen and/or sulfur atoms and/or one or more substituted or unsubstituted imino groups, $C_6$-$C_{12}$-aryl or $C_5$-$C_{12}$-cycloalkyl, where the radicals mentioned may each be substituted by aryl, alkyl, aryloxy, alkyloxy, heteroatoms and/or heterocycles, and $R^{34}$ can be $C_2$-$C_{20}$-alkylene, $C_5$-$C_{12}$-cycloalkylene or $C_2$-$C_{20}$-alkylene interrupted by one or more oxygen and/or sulfur atoms and/or one or more substituted or unsubstituted imino groups and/or by one or more cycloalkyl, —CO—, —O(CO)O—, —(NH)(CO)O—, —O(CO)(NH)—, —O(CO)— or —(CO)O— groups, where the radicals mentioned may each be substituted by aryl, alkyl, aryloxy, alkyloxy, heteroatoms and/or heterocycles.

Here, $C_1$-$C_{20}$-alkylene is linear or branched alkylene, e.g. methylene, 1,2-ethylene, 1,2- or 1,3-propylene, 1,2-, 1,3- or 1,4-butylene, 1,1-dimethyl-1,2-ethylene or 1,2-dimethyl-1,2-ethylene, 1,6-hexylene, 1,8-octylene, 1,10-decylene, 1,12-dodecylene and 1,20-eicosylene, and $C_3$-$C_{12}$-cycloalkylene is, for example, cyclopropylene, cyclopentylene, cyclohexylene, cyclooctylene and cyclododecylene.

The radical $R^{33}$ is preferably optionally substituted $C_6$-$C_{12}$-aryl or $C_1$-$C_{20}$-alkyl, particularly preferably optionally substituted $C_1$-$C_{20}$-alkyl, very particularly preferably unsubstituted $C_1$-$C_{20}$-alkyl.

The radical $R^{35}$ is preferably optionally substituted $C_1$-$C_{20}$-alkyl, particularly preferably unsubstituted $C_1$-$C_{20}$-alkyl.

The radical $R^{34}$ is preferably methylene, 1,2-ethylene or 1,2-propylene, particularly preferably 1,2-ethylene.

Very particularly preferred thioethers are those in which at least one of the radicals $R^{31}$ and $R^{32}$, preferably both, is/are identical or different $C_1$-$C_{20}$-alkyloxycarbonylalkyl groups, preferably $C_1$-$C_{20}$-alkyloxycarbonylethyl groups.

Especial preference is given to compounds of the formula

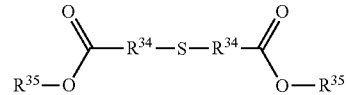

where $R^{34}$ and $R^{35}$ are as defined above.

In a preferred embodiment, the thioethers comprise further functional groups which may improve the antioxidant action and/or the solubility of the thioethers in the polyisocyanate preparation.

Preferred thioethers are thiodipropionic esters, for example dimethyl 3,3'-thiodipropionate [4131-74-2], ditetradecyl 3,3'-thiodipropionate [16545-54-3], dioctadecyl 3,3'-thiodipropionate [693-36-7]. Particular preference is given to ditridecyl 3,3'-thiodipropionate [10595-72-9] (e.g. Evanstab® 13 from Evans Chemetics), didodecyl 3,3'-thiodipropionate [123-28-4] (e.g. Irganox® PS 800 FL from Ciba Specialty Chemicals; Evanstab® 12 from Evans Chemetics).

Ditridecyl 3,3'-thiodipropionate is liquid and is therefore particularly well suited for surface coating components and metering thereof. Didodecyl 3,3'-thiodipropionate and ditetradecyl 3,3'-thiodipropionate are likewise well suited because of their low melting points. Didodecyl 3,3'-thiodipropionate (and dioctadecyl 3,3'-thiodipropionate), in particular, have been examined very thoroughly in terms of toxicology and are unproblematical for human beings. They represent only a small pollution hazard to water.

Many of the 3,3'-thiodipropionic esters are available on an industrial scale.

The thioethers, in particular the 3,3'-thiodipropionic esters, are generally stable to hydrolysis.

The last-mentioned 3,3'-thiodipropionic esters also display no odor pollution compared to the phosphites of the prior art.

Particularly preferred thioethers are those which are liquid at 23° C. or have a melting point below 50° C.

At least one sterically hindered phenol can optionally be present; preference is given to at least one, preferably precisely one, phenol being present. Phenols have the function of a primary antioxidant for the purposes of the invention. To a person skilled in the art, primary antioxidants are usually compounds which scavenge free radicals.

Examples of phenols are alkylphenols, for example o-, m- or p-cresol (methylphenol), 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol or 2,2'-methylenebis(6-tert-butyl-4-methylphenol), 4,4'-oxybiphenyl, 3,4-methylenedioxydiphenol (sesamol), 3,4-dimethylphenol, hydroquinone, catechol (1,2-dihydroxybenzene), 2-(1'-methylcyclohex-1'-yl)-4,6-dimethylphenol, 2- or 4-(1'-phenyleth-1'-yl)phenol, 2-tert-butyl-6-methylphenol, 2,4,6-tris-tert-butylphenol, 2,6-di-tert-butylphenol, 2,4-di-tert-butylphenol, 4-tert-butylphenol, nonylphenol [11066-49-2], octylphenol [140-66-9], 2,6-dimethylphenol, bisphenol A, bisphenol F, bisphenol B, bisphenol C, bisphenol S, 3,3',5,5'-tetrabromo-bisphenol A, 2,6-di-tert-butyl-p-cresol, Koresin® from BASF AG, methyl 3,5-di-tert-butyl-4-hydroxybenzoate, 4-tert-butylcatechol, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 6-isopropyl-m-cresol, n-octadecyl β-(3,5-di-tert-butyl-4-hydroxyphenyl)propionate, 1,1,3-tris-(2-methyl-4-hydroxy-5-tert-butylphenyl)butane, 1,3,5-trimethyl-2,4,6-tris(3,5-di-tert-butyl-4-hydroxybenzyl)benzene, 1,3,5-tris(3,5-di-tert-butyl-4-hydroxybenzyl) isocyanurate, 1,3,5-tris-(3,5-di-tert-butyl-4-hydroxyphenyl) propionyloxyethylisocyanurate, 1,3,5-tris-(2,6-dimethyl-3-hydroxy-4-tert-butylbenzyl)isocyanurate or pentaerythrityl tetrakis[β-(3,5-di-tert-butyl-4-hydroxyphenyl)propionate], 2,6-di-tert-butyl-4-dimethylaminomethyl-phenol, 6-isobutyl-2,4-dinitrophenol, 6-sec-butyl-2,4-dinitrophenol, Irganox® 565, 1141, 1192, 1222 and 1425 from Ciba Spezialitätenchemie, octadecyl 3-(3',5'-di-tert-butyl-4'-hydroxyphenyl)propionoate, hexadecyl 3-(3',5'-di-tert-butyl-4'-hydroxyphenyl)propionoate, octyl 3-(3',5'-di-tert-butyl-4'-hydroxyphenyl)propionoate, 3-thia-1,5-pentanediol bis[(3',5'-di-tert-butyl-4'-hydroxyphenyl)propionate], 4,8-dioxa-1,1'-undecanediol bis[(3',5'-di-tert-butyl-4'-hydroxyphenyl) propionate], 4,8-dioxa-1,1'-undecanediol bis[(3'-tert-butyl-4'-hydroxy-5'-methylphenyl)propionate], 1,9-nonanediol bis [(3',5'-di-tert-butyl-4'-hydroxyphenyl)propionate], 1,7-heptanediaminebis[3-(3',5'-di-tert-butyl-4'-hydroxyphenyl) propionamide], 1,1-methanediaminebis[3-(3',5'-di-tert-butyl-4'-hydroxyphenyl)propionamide], 3-(3',5'-di-tert-butyl-4'-hydroxyphenyl)propionoic hydrazide, 3-(3',5'-dimethyl-4'-hydroxyphenyl)propionoic hydrazide, bis(3-tert-butyl-5-ethyl-2-hydroxyphen-1-yl)methane, bis(3,5-di-tert-butyl-4-hydroxyphen-1-yl)methane, bis[3-(1'-methylcyclohex-1'-yl)-5-methyl-2-hydroxyphen-1-yl] methane, bis(3-tert-butyl-2-hydroxy-5-methylphen-1-yl) methane, 1,1-bis(5-tert-butyl-4-hydroxy-2-methylphen-1-yl)ethane, bis(5-tert-butyl-4-hydroxy-2-methylphen-1-yl) sulfide, bis(3-tertbutyl-2-hydroxy-5-methylphen-1-yl) sulfide, 1,1-bis(3,4-dimethyl-2-hydroxyphen-1-yl)-2-methylpropane, 1,1-bis(5-tert-butyl-3-methyl-2-hydroxyphen-1-yl)butane, 1,3,5-tris[1'-(3",5"-di-tert-butyl-4"-hydroxyphen-1"'-yl)meth-1'-yl]-2,4,6-trimethylbenzene, 1,1,4-tris(5'-tert-butyl-4'-hydroxy-2'-methylphen-1'-yl)butane, aminophenols such as para-aminophenol, 3-diethylaminophenol, nitrosophenols such as para-nitrosophenol, p-nitroso-o-cresol, alkoxyphenols, for example 2-methoxyphenol (guaiacol, catechol monomethyl ether), 2-ethoxyphenol, 2-isopropoxyphenol, 4-methoxyphenol (hydroquinone monomethyl ether), mono- or di-tert-butyl-4-methoxyphenol, 3,5-di-tert-butyl-4-hydroxyanisole, 3-hydroxy-4-methoxybenzyl alcohol, 2,5-dimethoxy-4-hydroxybenzyl alcohol (syring a alcohol), 4-hydroxy-3-methoxybenzaldehyde (vanillin), 4-hydroxy-3-ethoxybenzaldehyde (ethyl vanilline), 3-hydroxy-4-methoxybenzaldehyde (isovanilline), 1-(4-hydroxy-3-methoxyphenyl)ethanone (acetovanillone), eugenol, dihydroeugenol, isoeugenol, tocopherols such as α-, β-, γ-, δ- and ε-tocopherol, tocol, α-tocopherolhydroquinone, hydroquinone or hydroquinone monomethyl ether, 2,5-di-tert-butylhydroquinone, 2-methyl-p-hydroquinone, 2,3-dimethylhydroquinone, trimethylhydroquinone, 4-methylcatechol, tert-butylhydroquinone, 3-methylcatechol, 2-methyl-p-hydroquinone, 2,3-dimethylhydroquinone, trimethylhydroquinone, 3-methylcatechol, 4-methylcatechol, tert-butylhydroquinone, 4-ethoxyphenol, 4-butoxyphenol, hydroquinone monobenzyl ether, p-phenoxyphenol, 2-methylhydroquinone, 2,5-di-tert-butylhydroquinone, 2,5-di-tert-amylhydroquinone and also 2,3-dihydro-2,2-dimethyl-7-hydroxybenzofuran (2,2-dimethyl-7-hydroxycumaran), 6-hydroxy-2,5,7,8-tetramethylchromane-2-carboxylic acid (Trolox®), gallic acid, ferulic acid, cinnamic acid and derivatives thereof.

Sterically hindered phenols are phenols which have precisely one phenolic hydroxy group and have a tert-butyl group in at least one, preferably both, ortho position(s) relative to the functional OH group.

Such phenols can also be constituents of a polyphenolic system having a plurality of phenol groups, e.g. pentaerythrityl tetrakis[β-(3,5-di-tert-butyl-4-hydroxyphenyl)propionate] (e.g. Irganox® 1010), Irganox® 1330,1,3,5-tris(3,5-di-tert-butyl-4-hydroxybenzyl)-1,3,5-triazine-2,4,6(1H,3H,5H)trione (e.g. Irganox® 3114), each products of Ciba Spezialitätenchemie.

Corresponding products are obtainable, for example, under the trade names Irganox® (Ciba Spezialitätenchemie), Sumilizer® from Sumitomo, Lowinox® from Great Lakes, Cyanox® from Cytec.

The primary antioxidants (or mixtures thereof) are preferably used in combination with one of the secondary antioxidants from the group consisting of phosphites, phosphonates, phosphonites and thio compounds (or mixtures thereof).

Sterically hindered phenols can in principle also be used alone, but together with secondary antioxidants they normally have a synergistic stabilizing effect, for which reason this combination is particularly preferred.

The addition of at least one of the stabilizers mentioned to the polyisocyanates obtained according to the invention is particularly preferred when the polyisocyanate has been admixed with at least one catalyst which is able to accelerate the reaction of isocyanate groups with groups which are reactive toward isocyanate. This is, for example, the case when polyurethane surface coatings are to be produced and the polyisocyanate component as crosslinker is to be cured by means of a polyol as binder.

In the presence of at least one catalyst which is able to accelerate the reaction of isocyanate groups with groups which are reactive toward isocyanate, if appropriate in the additional presence of solvents (and, if appropriate, other customary surface coating additives), the presence of at least one of the stabilizers mentioned has a positive effect on the maintenance of low color numbers during storage, in particular during storage at temperatures above room temperature.

Compounds which are able to accelerate the reaction of isocyanate groups with groups which are reactive toward isocyanate are compounds whose presence in a starting mixture leads to a higher proportion of urethane group-comprising reaction products than would be the case for the same starting mixture in their absence under the same reaction conditions.

These compounds are known from the literature, for example from G. Oertel (editor), Polyurethane, 3rd edition 1993, Carl Hanser Verlag, Munich—Vienna, pages 104 to 110, chapter 3.4.1. "Katalysatoren", with preference being given to organic amines, in particular tertiary aliphatic, cycloaliphatic or aromatic amines, Brønsted acids and/or Lewis-acid metal-organic compounds, particularly preferably Lewis-acid metal-organic compounds.

Possible Lewis-acid organic metal compounds are, for example, tin compounds such as tin(II) salts of organic carboxylic acids, e.g. tin(II) diacetate, tin(II) dioctoate, tin(II) bis(ethylhexanoate) and tin(II) dilaurate, and the dialkyltin (IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. It is also possible to use zinc(II) salts such as zinc(II) dioctoate.

Unless indicated otherwise, the carboxylic acids can, e.g. in the case of octoate, be branched and/or unbranched isomers, preferably unbranched isomers.

Metal complexes such as acetylacetonates of iron, titanium, aluminum, zirconium, manganese, nickel, zinc and cobalt are also possible.

Further metal catalysts are described by Blank et al. in Progress in Organic Coatings, 1999, vol. 35, pages 19-29.

As tin- and zinc-free alternatives, use is made of, inter alia, zirconium, bismuth and aluminum compounds. These are, for example, zirconium tetraacetylacetonate (e.g. K-KAT® 4205 from King Industries); zirconium dionates (e.g. K-KAT® XC-9213; XC-A 209 and XC-6212 from King Industries); bismuth compounds, in particular tricarboxylates (e.g. K-KAT® 348, XC-B221; XC-C227, XC 8203 from King Industries); aluminum dionate (e.g. K-KAT® 5218 from King Industries). Tin- and zinc-free catalysts are also marketed, for example, under the trade names Borchi® Kat from Borchers, TK from Goldschmidt or BICAT® from Shepherd, Lausanne.

These catalysts are suitable for solvent-based, water-based and/or blocked systems.

Molybdenum, tungsten and vanadium catalysts are described, particularly for the reaction of blocked polyisocyanates, in WO 2004/076519 and WO 2004/076520.

Cesium salts can also be used as catalysts. Possible cesium salts are compounds in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, where n is from 1 to 20.

Preference is given to cesium carboxylates in which the anion has the formula $(C_nH_{2n-1}O_2)^-$ or $(C_{n+1}H_{2n-2}O_4)^{2-}$ where n is from 1 to 20. Particularly preferred cesium salts have monocarboxylates of the general formula $(C_nH_{2n-1}O_2)^-$ where n is from 1 to 20, as anions. Particular mention may here be made of formate, acetate, propionate, hexanoate and 2-ethylhexanoate.

Preferred Lewis-acid organic metal compounds are dimethyltin diacetate, dibutyltin dibutyrate, dibutyltin bis(2-ethylhexanoate), dibutyltin dilaurate, dioctyltin dilaurate, zinc (II) dioctoate, zirconium acetylacetonate and zirconium 2,2,6,6-tetramethyl-3,5-heptanedionate.

However, particular preference is given to dibutyltin dilaurate.

The binders can be, for example, polyacrylate polyols, polyester polyols, polyether polyols, polyurethane polyols; polycarbonate polyols; polyurea polyols; polyester polyacrylate polyols; polyester polyurethane polyols; polyurethane polyacrylate polyols, polyurethane-modified alkyde resins; fatty acid-modified polyester polyurethane polyols, copolymers with allyl ethers, graft polymers from the abovementioned groups of substances having, for example, different glass transition temperatures and also mixtures of the binders mentioned. Preference is given to polyacrylate polyols, polyester polyols and polyether polyols.

Such compounds and their use in polyurethane surface coatings are known per se to those skilled in the art and require no further description.

The polyisocyanates obtained according to the invention can be used for producing polyurethanes and polyurethane surface coatings, for example for one-component, two-component, radiation-curable or powder coating systems, and surface coating compositions produced therewith can be used for coating various substrates such as wood, wood veneer, paper, paperboard, cardboard, textile, leather, nonwoven, plastic surfaces, glass, ceramic, mineral building materials, metals or coated metals.

When used in coating compositions, the polyisocyanates according to the invention can be used, in particular, in primers, fillers, pigmented topcoats, undercoats and clear coatings in the field of surface coating for automobile repair or large vehicles. Such coating compositions are particularly useful for applications in which a particularly high application reliability, exterior weathering resistance, optical appearance and resistance to solvents, chemicals and water are required, as is required in surface coating for automobile repairs and large vehicles and in working vehicles in agriculture and the building sector.

Such coating compositions are suitable as or in exterior coatings, i.e. applications in which they are exposed to daylight, preferably parts of buildings, interior coatings, coatings on (large) vehicles and aircraft and industrial applications, bridges, buildings, power pylons, tanks, containers, pipelines, power stations, chemical plants, ships, cranes, piling, plug walls, valves, pipes, fittings, flanges, couplings, halls, roofs and building steel. In particular, the coating compositions of the invention are used as or in clear coating(s) and topcoat(s) for automobiles. Further preferred fields of use are can coating and coil coating.

They are also particularly suitable as primers, fillers, pigmented topcoats and clear coatings in the field of industrial, wood, automobile, in particular OEM, surface coating or decorative surface coating. The coating compositions are very particularly suitable for applications in which a particularly high application reliability, exterior weathering resistance, optical appearance, scratch resistance and resistance to solvents and/or chemicals are required. Their low color number and high color stability make them particularly interesting for coating compositions for clear coatings. They are of particular interest in combination with antioxidants and Lewis-acid compounds, if appropriate in the presence of solvents, in particular during storage.

EXAMPLES

Comparative Example 1

Without Urethanization and Without Addition of Alcohol 588 g of hexamethylene 1,6-diisocyanate (HDI) obtained by phosgenation of 1,6-hexamethylenediamine were placed in a reaction vessel at room temperature (23° C.), maintained under nitrogen for 1 hour and subsequently heated to 40° C. This was followed by addition of DABCO TMR® from Air Products.

The mixture was subsequently heated to 60° C. After an NCO value of 40.1% had been reached, the reaction was stopped by means of an equimolar amount of XHC-20 (from Huntsman, X═O, R$^1$═2-hydroxyethyl, R$^2$═H in the formula (I) above), based on the catalyst used, at 65° C. After addition of this stopper, a reduction in temperature was observed, i.e. the catalyst used was no longer active. After filtration, the excess HDI was virtually completely removed in a thin film evaporator at an exterior temperature of 170° C.

| | |
|---|---|
| Color number after distillation: | 39 Hz |
| Viscosity after distillation: | 2400 mPas |

Comparative Example 2

Without Urethanization and without Addition of Alcohol

The experiment in comparative example 1 was repeated using HDI obtained by reaction of 1,6-hexamethylenediamine with urea and n-butanol and thermal dissociation of the carbamates obtained.

| | |
|---|---|
| Color number after distillation: | 42 Hz |
| Viscosity after distillation: | 2550 mPas |

Comparative Example 3

Using Ethanol for the Urethanization Instead of a Higher Alcohol 588 g of freshly distilled HDI obtained from a phosgenation process were admixed with 12 g of ethanol and stirred at 80° C. for 2 hours. The temperature was then reduced to 65° C. This was followed by addition of 160 ppm of DABCO® TMR. At an NCO value of 41.6%, an equimolar amount of XHC-20 (from Huntsman, X═O, R$^1$═2-hydroxyethyl, R$^2$═H in the formula (I) above), based on the catalyst used, was added.

The mixture was stirred for another 1 hour and the NCO value was measured again.
NCO value after the after-reaction: 41.5%.

After filtration, the excess HDI was virtually completely removed in a thin film evaporator at an exterior temperature of 170° C.

| | |
|---|---|
| Color number after distillation: | 34 Hz |
| Viscosity after distillation: | 1980 mPas |

The color number of 34 Hz when ethanol is used for the urethanization is not as good as in the examples according to the invention using higher alcohols. In addition, the monourethane derived from ethanol and hexamethylene diisocyanate formed as relatively volatile secondary components causes potential complications in production.

Comparative Example 4

Without Prior Urethanization, without Chemical Stopper, with Thermal Stopping 588 g of hexamethylene 1,6-diisocyanate (HDI) obtained by phosgenation of 1,6-hexamethylenediamine were placed in a reaction vessel at room temperature (23° C.), maintained under nitrogen for 1 hour and subsequently heated to 40° C. This was followed by addition of 60 ppm of N,N,N-trimethyl-N-benzylammonium hydroxide in the form of a 3% strength solution in 2-ethylhexanol.

The temperature rose from 40° C. to 52° C. The mixture was subsequently heated to 60° C. After an after-reaction time of 100 minutes, the NCO value was 40.6%.

The reaction was stopped by heating to 120° C. After filtration, the excess HDI was virtually completely removed in a thin film evaporator at an exterior temperature of 170° C.

This gave a yellowish product.

| | |
|---|---|
| Color number after distillation: | 78 Hz |
| NCO content after distillation: | 21.7% |
| Viscosity after distillation: | 2400 mPas. |

Comparative Example 5

Without Prior Urethanization, with Chemical Stopper not According to the Invention Processing was carried out in a manner analogous to comparative example 4, but the reaction was stopped by means of a molar amount of benzoyl chloride, based on the catalyst used, at 65° C. after an NCO value of 40.4% had been reached.

| | |
|---|---|
| Color number after distillation: | 41 Hz |
| Viscosity after distillation: | 2450 mPas |

Example 1

Hexamethylene 1,6-diisocyanate from a phosgene process was stirred in the presence of 0.7% by weight of 2-ethylhexanol at a temperature of 95° C. for 90 mins. 65 ppm by weight of (2-hydroxypropyl)-N,N,N-trimethylammonium 2-ethylhexanoate solution (DABCO® TMR) as catalyst for the trimerization was subsequently added and the mixture was allowed to react at 65° C.

At an NCO value of 40.5% by weight in the reaction mixture, the reaction was stopped by addition of 150 ppm by weight of 2-hydroxyethyl carbamate. The excess, monomeric isocyanate was removed by vacuum distillation at 145° C.

| | |
|---|---|
| Color number after distillation: | 23 Hz |
| NCO content after distillation: | 21.0% |
| Viscosity after distillation: | 3100 mPa * s. |

The example according to the invention displays a lower color number than the comparative examples.

Example 2

Using a method analogous to example 1, a product from the same starting materials was stopped at an earlier point in time. This gave a polyisocyanate mixture having the following analytical data:

| | |
|---|---|
| Color number after distillation: | 23 Hz |
| NCO content after distillation: | 21.3% |
| Viscosity after distillation: | 2680 mPa * s |

Example 3

Hexamethylene 1,6-diisocyanate from a phosgene process was stirred in the presence of 1.0% by weight of 2-ethylhexanol at a temperature of 100° C. for 40 minutes. 120 ppm of (2-hydroxypropyl)-N,N,N-trimethylammonium 2-ethylhexanoate (DABCO® TMR1) as catalyst (diluted to a concentration of 7.5% in ethylene glycol monomethyl ether) for the trimerization were subsequently added and the mixture was allowed to react at 65° C.

At an NCO value of 40.9% by weight in the reaction mixture, the reaction was stopped by addition of a three-fold excess of 2-hydroxyethyl carbamate (20% strength solution in ethylene glycol monomethyl ether). The excess, monomeric isocyanate was removed by vacuum distillation at 145° C.

This gave a polyisocyanate mixture having the following analytical data:

| | |
|---|---|
| Color number after distillation: | 21 Hz |
| NCO content after distillation: | 20.8% |
| Viscosity after distillation: | 2280 mPa * s |
| Residual monomer after distillation: | 0.21% |

Example 4

Hexamethylene 1,6-diisocyanate from a urea process was stirred in the presence of 1.0% by weight of 2-ethylhexanol at a temperature of 70° C. for 40 minutes. 170 ppm of (2-hydroxypropyl)-N,N,N-trimethylammonium 2-ethylhexanoate (DABCO® TMR1) as catalyst (diluted to a concentration of 7.5% in ethylene glycol monomethyl ether) for the trimerization were subsequently added and the mixture was allowed to react at 65° C.

At an NCO value of 40.5% by weight in the reaction mixture, the reaction was stopped by addition of a three-fold excess of 2-hydroxyethyl carbamate (20% strength solution in ethylene glycol monomethyl ether). The excess, monomeric isocyanate was removed by vacuum distillation at 145° C.

This gave a polyisocyanate mixture having the following analytical data:

| | |
|---|---|
| Color number after distillation: | 19 Hz |
| NCO content after distillation: | 19.7% |
| Viscosity after distillation: | 4740 mPa * s |

Example 5

Hexamethylene 1,6-diisocyanate from a urea process was stirred in the presence of 0.5% by weight of 2-ethylhexanol at a temperature of 90° C. for about 20 minutes. 130 ppm by weight of (2-hydroxypropyl)-N,N,N-trimethylammonium 2-ethylhexanoate (DABCO® TMR1) as catalyst (diluted to a concentration of 7.5% in ethylene glycol monomethyl ether) for the trimerization were subsequently added and the mixture was allowed to react at 65° C. At an NCO value of 44.7% by weight in the reaction mixture, the reaction was stopped by addition of a three-fold excess of 2-hydroxyethyl carbamate solution (20% strength solution in ethylene glycol monomethyl ether). The excess, monomeric isocyanate was removed by vacuum distillation.

This gave a polyisocyanate mixture having the following analytical data:

| | |
|---|---|
| Color number after distillation: | 19 Hz |
| NCO content after distillation: | 21.8% |
| Viscosity after distillation: | 1350 mPa * s |

Example 6

Hexamethylene 1,6-diisocyanate from a phosgene process was stirred in the presence of 0.5% by weight of 2-ethylhexanol at a temperature of 90° C. 95 ppm by weight of (2-hydroxypropyl)-N,N,N-trimethylammonium 2-ethylhexanoate (DABCO®) TMR1) as catalyst (diluted to a concentration of 7.5% in ethylene glycol monomethyl ether) for the trimerization were added and the mixture was allowed to react at 65° C. At an NCO value of 45.0% by weight in the reaction mixture, the reaction was stopped by addition of a three-fold excess of 2-hydroxyethyl carbamate (20% strength solution in ethylene glycol monomethyl ether). The excess, monomeric isocyanate was removed by vacuum distillation.

This gave a polyisocyanate mixture having the following analytical data:

| | |
|---|---|
| Color number after distillation: | 19 Hz |
| NCO content after distillation: | 21.7% |
| Viscosity after distillation: | 1100 mPa * s |

Use Studies:

The use examples were carried out using the following compounds:
Catalysts W
Catalyst W: Dibutyltin dilaurate (DBTL, DBTDL)
Phenols X
Phenol X: 3,5-bis(1,1-dimethylethyl)-4-hydroxy-C7-C9 branched alkyl ester of benzenepropionoic acid (Irganox® 1135 from Ciba Spezialitätenchemie)
Secondary Antioxidants (Y)
Phosphonite Y-1: tetrakis(2,4-di-tert-butylphenyl) 4,4'-diphenylenediphosphonite C (Irgafos® P-EPQ from Ciba Spezialitätenchemie) (purified by shaking with hexane and water and subsequently drying the organic phase over magnesium sulfate)
Thioether Y-2: ditridecyl 3,3'-thiodipropionoate
Phosphonate Y-3: Diphenyl phosphonate $(C_6H_5O)_2P(=O)H$
Phosphonate Y-4: Di-n-butyl phosphonate $(C_4H_9O)_2P(=O)H$
Phosphonate Y-5: Dibenzyl phosphonate $(C_6H_5CH_2O)_2P(=O)H$
Phosphite Y-6: Tributyl phosphite
Phosphite Y-7: Triphenyl phosphite
Solvents Z
Solvent Z-1: Solventnaphtha (boiling range about 170-180° C.)
Solvent Z-2: n-butyl acetate The polyisocyanates were stored at a concentration of about 50% by weight with the concentrations indicated in the following experiments of catalyst (W) dibutyltin dilaurate (DBTL), phenols (X) and secondary antioxidant (Y), in each case 10% strength by weight in butyl acetate, and about 50% by weight of solvent (Z) under nitrogen in firmly closed screw-top containers so as to exclude air. Traces of air are not ruled out.

The percentages by weight are based on a total weight of 100%. The concentrations of the compounds (W), (X), (Y) in ppm relate to the respective undiluted state of the compounds (W) to (Y) and are based on the total amount of polyisocyanate.

Storage is in each case carried out at 50° C. in a convection oven. The color numbers are measured immediately (directly before commencement of storage) and after storage for various periods of time.

The measurement of the color number in this text is, unless indicated otherwise, carried out in APHA in accordance with DIN EN 1557 on a Lico 300 instrument from Lange using a 5 cm measurement cell having a volume of 5 ml. The error tolerances are for the set value 20 Hz (+/−5, actual value 18 Hz); set value 102 Hz (+/−10, actual value 99 Hz); set value 202 Hz (+/−20, actual value 197 Hz).

Each measurement was compared directly with a sample which was free of stabilizer.

TABLE 1

Experiments using polyisocyanate from example 1, 1000 ppm of catalyst DBTL (W) and further components as per the following table at 50° C.

| Solvent about 50% | Phenol X ppm | Secondary antioxidant | Amount ppm | Color number immediately Hz | Color number 7 days Hz | Color number 70 days Hz |
|---|---|---|---|---|---|---|
| Z-1 | 0 | | 0 | 13 | 67 | 141 |
| Z-1 | 300 | | 0 | 14 | 33 | 86 |
| Z-1 | 200 | Y-1 | 600 | 16 | 23 | 44 |
| Z-1 | 200 | Y-6 | 600 | 14 | 21 | 40 |
| Z-1 | 200 | Y-7 | 600 | 13 | 21 | 53 |
| Z-2 | 0 | | 0 | 10 | 29 | 53 |
| Z-2 | 300 | | 0 | 11 | 14 | 47 |
| Z-2 | 200 | Y-1 | 600 | 13 | 14 | 15 |
| Z-2 | 200 | Y-6 | 600 | 12 | 12 | 13 |
| Z-2 | 200 | Y-7 | 600 | 10 | 12 | 14 |

The experimental results show that the antioxidative stabilization by the compound X in combination with Y-1, Y-6 and Y-7 is significant.

TABLE 2

Experiments using 45% of polyisocyanate from example 2, 2.5% of butyl acetate (Z-2), 52.5% of solventnaphtha (Z-1) together with 1000 ppm of catalyst DBTL (W) and further components as per the following table at 50° C.

| Phenol X ppm | Thioether Y-2 ppm | Color number immediately Hazen | Color number 7 days Hazen | Color number 28 days Hazen | Color number 70 days Hazen |
|---|---|---|---|---|---|
| 0 | 0 | 17 | 93 | 123 | 389 |
| 200 | 600 | 18 | 35 | 43 | 113 |

The experimental results show that the antioxidative stabilization by the compounds X and Y-2 is significant.

TABLE 3

Experiments using 45% of polyisocyanate analogous to example 1 with color number 23 Hz; NCO content 21.4% and viscosity 3250 mPa * s, 2.5% of butyl acetate (Z-2) and 52.5% of solventnaphta (Z-1); together with 1000 ppm of catalyst DBTL (W) and further components as per the following table at 50° C.

| Phenol X ppm | Phosphonate | Phosphonate ppm | Color number immediately Hz | Color number 7 days Hz | Color number 70 days Hz |
|---|---|---|---|---|---|
| 0 | | 0 | 12 | 90 | 158 |
| 200 | Y-3 | 600 | 11 | 31 | 61 |
| 200 | Y-4 | 600 | 12 | 32 | 53 |
| 200 | Y-5 | 600 | 12 | 38 | 67 |

The experimental results show that the antioxidative stabilization by the compounds Y-3, Y-4 and Y-5 and X is significant.

The invention claimed is:

1. A process for preparing an isocyanurate group-comprising polyisocyanate mixture of (cyclo)aliphatic diisocyanates, comprising
a) reacting monomeric (cyclo)aliphatic diisocyanate (D) with at least one monofunctional or bifunctional alcohol (A) having from 3 to 10 carbon atoms to form urethane groups in the absence of compounds which catalyze this reaction,
b) reacting the reaction mixture obtained from a) in the presence of at least one catalyst (K) which catalyzes the reaction of isocyanates to form isocyanurate groups,
c) deactivating the catalyst (K) from step b) by adding a catalyst poison (S),
d) separating the unreacted (cyclo)aliphatic diisocyanate (D) from the reaction mixture obtained from c) and
e) optionally carrying out ozonolysis of the distillation bottoms obtained from d),
wherein the catalyst poison (S) is a compound of the formula

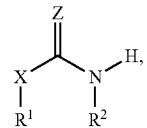

where
$R^1$ and $R^2$ are each, independently of one another, hydrogen or $C_1$-$C_{20}$-alkyl, $C_6$-$C_{12}$-aryl or $C_5$-$C_{12}$-cycloalkyl each of which is optionally substituted by aryl, alkyl, aryloxy, alkyloxy, heteroatoms and/or heterocycles,
where when X=O or S, $R^1 \neq H$
and
$R^1$ and $R^2$ together with the group X (CO) NH can also form a 5 to 12-membered ring, with $R^1$ and $R^2$ together forming an optionally substituted divalent $C_2$-$C_9$-alkylene radical which can also be part of an arylene or cycloalkylene radical,
Z is oxygen (O) or sulfur (S),
X is oxygen (O), sulfur (S), imino (NH) or substituted imino ($NR^3$) and
$R^3$ is $C_1$ - $C_4$-alkyl,
where the radical $R^1$ in the case of the compound (S) has at least one group which is reactive toward isocyanate selected from the group consisting of mercapto, amino, monosubstitued amino and hydroxyl.

2. The process according to claim 1, wherein the catalyst (K) is a quaternary ammonium salt of the formula

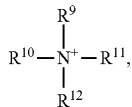

where
$Y^- = R^{13}COO^-$,
where
$R^{13}$ is hydrogen, $C_1$ - $C_{20}$-alkyl, $C_6$ - $C_{12}$-aryl or $C_7$ - $C_{20}$-arylalkyl, each of which is optionally substituted, and
$R^9$ to $R^{12}$ are identical or different alkyl groups which have from 1 to 20 carbon atoms and are optionally substituted by hydroxy or phenyl groups.

3. The process according to claim 1, wherein the alkyl (A) is selected from the group consisting of monofunctional alkanols and bifunctional alkanediols.

4. The process according to claim 3, wherein the alkanol is selected from the group consisting of n-butanol, isobutanol, n-hexanol, n-octanol, ethylene glycol monomethyl ether and 2-ethylhexanol.

5. The process according to claim 3, wherein the alkanediol is selected from the group consisting of 1,2-propanediol, ethylene glycol, 2,2-dimethyl-1,2-ethanediol, 1,3-propanediol, 1,2-butanediol, 1,4-butanediol, 1,5-pentanediol, 1,6-hexanediol, 2-methyl-1,3-pentanediol, 2-ethyl-1,3-hexanediol, 2,2,4-trimethyl-1,3-pentanediol, 2-propyl-1,3-heptanediol, 1,8-octanediol and 1,10-decanediol.

6. The process according to claim 1, wherein the diisocyanate (D) is selected from the group consisting of hexamethylene 1,6-diisocyanate and isophorone diisocyanate.

7. The process according to claim 1, wherein the compound (S) is selected from the group consisting of O-2-hydroxyethyl carbamate, O-3-hydroxypropyl carbamate and O-2-hydroxypropyl carbamate and mixtures thereof.

* * * * *